Figure 1:
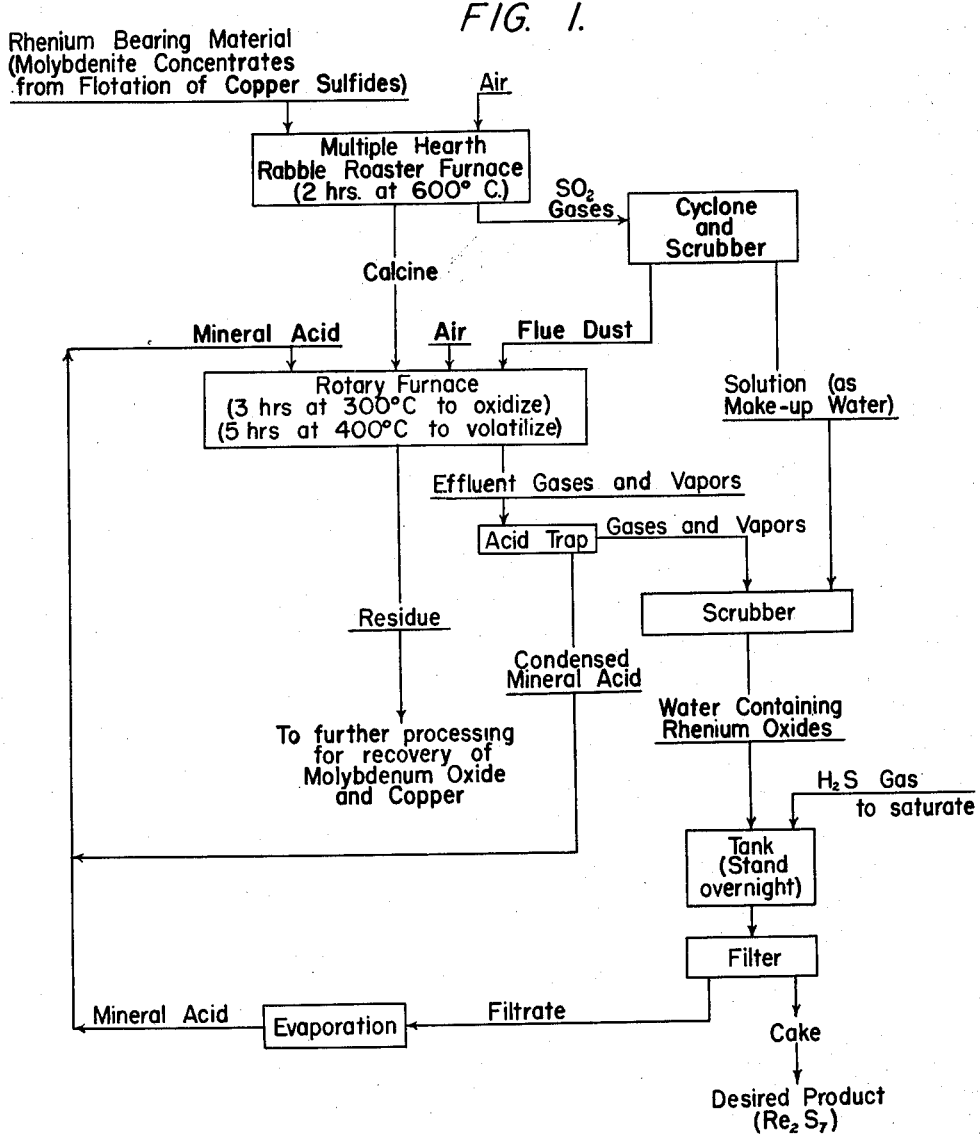

2,967,757
Patented Jan. 10, 1961

2,967,757

ACID PROCESS FOR THE RECOVERY OF RHENIUM VALUES FROM MINERALS CONTAINING SAME

Stuart R. Zimmerley and Emil E. Malouf, Salt Lake City, Utah, assignors to Kennecott Copper Corporation, New York, N.Y., a corporation of New York Filed Oct. 31, 1958, Ser. No. 771,161

5 Claims. (Cl. 23—19)

This invention relates to the recovery of rhenium from various mineral materials in which it occurs.

Rhenium has so far been found only as a trace element in various minerals. While there are some of these, such as various columbites, gadolinites, ilsemannites, and several of the platinum ores, that might conceivably be worked for their rhenium content, the principal source of rhenium at the present time is molybdenum sulfide metallurgical concentrates derived as an incident of copper recovery by the flotation treatment of low grade copper sulfide ores in which the rhenium content is hardly discernible. Rhenium is recovered from flue dusts and gases resulting from the roasting of such molybdenum sulfide concentrates for the production of molybdenum oxide, the rhenium sulfide being converted to the volatile heptoxide during the roasting operation.

We have heretofore developed an advantageous rhenium recovery process of the above type, which forms the subject of our copending application for U.S. Patent Serial Number 500,390, filed April 11, 1955, and entitled "Extraction of Rhenium Incidental to Manufacture of Molybdenum Oxide," now U.S. Patent No. 2,809,092, granted October 8, 1957. While that process ties in best with procedures and equipment presently utilized in the commercial production of molybdenum oxide, the process of this invention is directed to the recovery of rhenium as a principal product; though one of its great advantages is the incidental production of a top quality molybdenum oxide from low grade molybdenum sulfide concentrates, with the possibility of economically recovering any significant copper content of the concentrates being treated.

Molybdenum sulfide concentrates derived by the flotation treatment of low grade copper sulfide ore of the Nevada Consolidated Division of Kennecott Copper Corporation contain approximately twice as much rhenium as those similarly derived from the low grade copper sulfide ore of the Chino Mines Division of the same corporation, although the former concentrates are of lower grade with respect to molybdenum content and copper contamination. While our present process is efficiently applicable to both concentrates, it is especially advantageous as applied to the former, for it offers the possibility of not only obtaining higher quality molybdenum oxide and recovery of copper therefrom, but of also eliminating some of the upgrading procedures presently carried out.

In our seeking for a more efficient method of recovering rhenium, we investigated known analytical techniques for its detection and quantitative evaluation. These techniques involve prolonged digestion of the rhenium-bearing material in a large excess of a high boiling point mineral acid, usually sulfuric, and distillation of the resulting solution at temperatures capable of volatilizing or distilling off the rhenium. It is necessary to either bubble steam or moist hydrochloric acid through the boiling solution, or to introduce hydrobromic acid, dropwise, beneath the surface thereof.

In these techniques, the acid is employed as a reactant for digesting the sample and solubilizing the rhenium and, also, as a carrier for the dissolved rhenium during reaction therewith of other reagents.

It was quite obvious that the quantity of acid required and the difficulty of carrying out the required procedures under industrial conditions render these known analytical techniques inapplicable to the commercial production of rhenium.

Our present process is based on work carried out by us under laboratory pilot plant conditions, which yielded recoveries of rhenium almost three times as great as obtained by the usual industrial roasting procedures and did not consume acid to an excessive extent.

In accordance with our process, if the rhenium-bearing material contains sulfur, as do molybdenum sulfide concentrates, it is preferably first roasted under closely controlled conditions to eliminate a large portion of the combined sulfur (about 50%) without volatilizing more than a very small part of the rhenium (about 2 to 3%). This greatly reduces the quantity of acid required in subsequent steps.

The resulting calcine, i.e. partially roasted material, is mixed with approximately twice its weight of a mineral acid, desirably sulfuric, to produce a slurry, and is subjected, first, to a rhenium-oxidizing temperature for a time sufficient to oxidize any rhenium not in oxidized form or to solubilize the rhenium if already oxidized, and, then, to a temperature and for a time sufficient to effectively volatilize the rhenium oxide. This entire treatment is preferably carried out in a rotary furnace or the like, but at least the second heating step is carried out under conditions of vigorous agitation of the material. The vaporized rhenium oxide is collected by scrubbing the effluent gases, and the pregnant solution so obtained is treated in known manner for the recovery of rhenium.

With molybdenum sulfide metallurgical concentrates as the raw material, the residue from the roasting operation may be treated by aqueous leaching and filtration, as more fully set forth and claimed in our copending application Serial No. 689,417, filed October 10, 1957, entitled "Acid Process for Production of High Grade Molybdenum Oxide," to produce molybdenum oxide and a filtrate susceptible of further treatment for the recovery of copper. Thus, besides low acid consumption and high rhenium recovery, the process is attractive for the opportunity it affords of economically recovering the copper content of such concentrates, as well as of producing a high grade molybdenum oxide.

Principal objects of the invention are to enable recovery of most (from about 90 to 95%) of the rhenium content of rhenium-bearing materials in an economical manner and on an industrial scale; to do this with respect to molybdenum sulfide metallurgical concentrates as a step in the production of a top grade molybdenum oxide; and to make practical the recovery of any significant quantities of copper contained by molybdenum sulfide metallurgical concentrates which are treated for both the recovery of rhenium and the production of molybdenum oxide.

Figure 2:
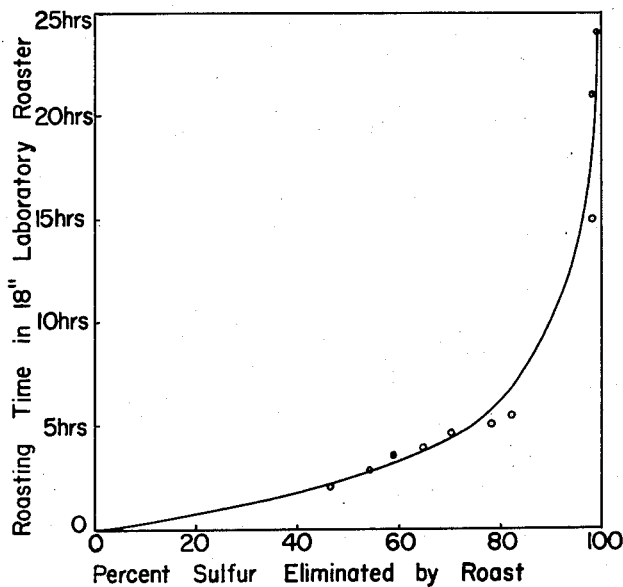
Figure 3:
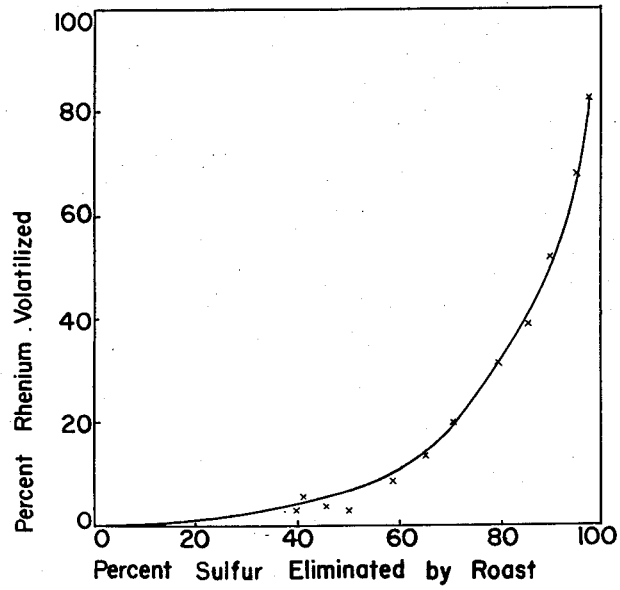

Further objects and features of the process will become apparent from the following detailed description of the particular preferred practice thereof indicated in the accompanying drawing, in which:

Fig. 1 is a flow sheet showing the process applied to a sulfur-bearing material containing rhenium, specifically, molybdenite concentrates derived from flotation of copper sulfide ores, for the volatilization and recovery of rhenium;

Fig. 2, a graph indicative of the percentage of sulfur eliminated relative to the time period of roasting of molybdenum sulfide concentrates; and Fig. 3, a graph indicative of the percentage of rhenium volatilized relative to the percentage of sulfur oxidized during the roasting period.

Before considering the preferred practice represented by the flow sheet of Fig. 1, it should be noted that our process is predicated fundamentally upon the use of a mineral acid to facilitate, in a first heating step, the formation and/or release of rhenium oxides from a rhenium-bearing mineral material, and, in a second heating step carried out under conditions of vigorous agitation of the material, volatilization of rhenium.

If the rhenium is already present as an oxide in the mineral material concerned, any mineral acid may be used for the purpose and the first-stage heat may be applied in any suitable equipment, whether or not air be present.

In those more common instances where the rhenium is not present as an oxide, it being realized that in most instances the rhenium will be present as a sulfide, the heating must be effected in the presence of supplied oxygen. If the acid employed is an oxidizing acid, as is sulfuric or nitric, no further oxygen is normally required, although it is preferred practice to carry out the two stages of heating successively in a standard rotary furnace open to the atmosphere.

If an acid that does not contain oxygen is used, for example, hydrochloric, oxygen must be otherwise supplied, as by roasting in the presence of air.

While most materials presently contemplated as commercial sources of rhenium contain sulfur combined with the rhenium and otherwise, the aforementioned mineral ilsemannite does not and it is conceivable that other materials of this type may be found. With these latter materials, the processing does not require the preliminary roasting found by us to be most advantageous in the handling of molybdenum sulfide concentrates and the like.

In the treatment of sulfur-bearing materials, such as molybdenum sulfide concentrates, by our process as shown in the flow sheet of Fig. 1, the concentrates are first roasted in any suitable equipment, preferably a continuous, rabble type, multiple hearth furnace, such as the well-known Herreshoff furnace, for the purpose of oxidizing such part of the sulfur as can be effectively eliminated without any significant loss of rhenium.

As indicated by the graphs of Figs. 2 and 3, it may be reasonably concluded that from 40 to 50% of the sulfur is eliminated, with the loss of less than 3% of the rhenium, by such a preliminary roast at approximately 600 degrees Centigrade continued for a period of approximately two hours.

The graphs of Figs. 2 and 3 are based upon the following data obtained from test runs carried out in a Pacific laboratory 18" hearth continuous rabble furnace, each using a charge of eight and one-half pounds of molybdenite concentrates derived from the treatment by customary flotation procedures of copper sulfide ore from Nevada Consolidated Division of Kennecott Copper Corporation:

| Roasting | | Calcine analysis, Percent | | Volatilization, Percent | |
|---|---|---|---|---|---|
| Time, Hrs. | Temp., °C. | Re | S | Re | S |
| 2 | 600 | .156 | 18.47 | 0.6 | 46.7 |
| 3 | 600 | .122 | 21.80 | 26.5 | 30.05 |
| 3.5 | 550–600 | .146 | 14.44 | 7.00 | 58.33 |
| 4 | 550–600 | .138 | 11.97 | 12.10 | 65.46 |
| 4.5 | 550–600 | .126 | 9.84 | 19.80 | 71.61 |
| 5 | 550–600 | .106 | 7.53 | 32.50 | 78.27 |
| 9 | 600 | .102 | 5.50 | 38.50 | 83.87 |
| 15 | 600 | .053 | 0.59 | 68.00 | 98.27 |
| 21 | 600 | .021 | 0.34 | 85.50 | 99.00 |
| 24 | 600 | .014 | 0.08 | 90.70 | 99.77 |

A preliminary roast controlled as indicated is highly advantageous in eliminating sulfur, which reduces the amount of acid required, without driving off any significant quantity of the rhenium.

In preferred practice, the partially roasted material, comparatively low in sulfur content, is charged, along with approximately twice its weight of a mineral acid, usually sulfuric, into a rotary furnace or other suitable apparatus capable of vigorously agitating and simultaneously heating a slurry, where it is intimately mixed and, thus, thoroughly wet with the acid and is subjected, first, to oxidizing heat, generally for a period of approximately three hours at approximately 300 degrees centigrade, and, immediately thereafter, to volatilizing heat, generally for a period of approximately five hours at approximately 400 degrees centigrade, the exact times and temperatures depending upon the particular mineral acid employed and the particular mineral material concerned. This will yield a recovery of from about 90 to 95% of the rhenium contained by the mineral material.

It is advantageous to pass the effluent gases from the preliminary roasting operation through a cyclone, or other particle collecting apparatus, and through a gas scrubber. The collected flue dusts are passed directly to the rotary furnace for mixture with the acid slurry, while the rhenium-containing scrubber solution is preferably passed, as make-up water, to a second scrubber used to treat the vapors from the rotary furnace. In this manner, practically none of the rhenium is lost.

The effluent gases and vapors from the rotary furnace are passed through a standard acid trap, where the volatilized acid is condensed out for re-use, as indicated. The remaining gases and vapors are passed through conventional scrubber apparatus, for collection of the rhenium-carrying vapors.

The resulting rhenium oxide solution may be treated as found most convenient for recovery of the rhenium oxides, for example and as indicated, by precipitation with hydrogen sulfide gas followed by filtration. With this treatment, the filter cake contains the rhenium as rhenium sulfide, while the filtrate contains some acid, which may be recovered by evaporation of such filtrate and re-used.

Repeated tests conducted in a laboratory rotary furnace 24" long and 12" in diameter on various quantities of the above-described, low sulfur, molybdenum sulfide calcine showed that, when two parts by weight of concentrated sulfuric acid was mixed with one part of the calcine and treated as indicated in the flow sheet of Fig. 1, over 90% of the rhenium was volatilized.

Typical laboratory data is shown by the following table:

| Charge Wt., Pounds | | Roasting (300° C.) Time, Hrs. | Distillation (400° C.) Time, Hrs. | Re Volatilization, Percent |
|---|---|---|---|---|
| Calcine | Acid | | | |
| 20 | 20 | 2 | 3 | 71 |
| 25 | 25 | 3 | 5 | 82.2 |
| 45 | 22.5 | 3 | 5 | 25 |
| 45 | 90 | 3 | 5 | 90.13 |

The residue from the rotary furnace is a powder that can be easily handled. By further treatment in the manner set forth in our afore-referred-to copending application Serial No. 689,417, a high purity (approximately 95%) molybdenum oxide is obtained and any copper content recovered.

Tests preliminary to those of the invention were carried out in a stationary retort on a basis of single stage heating, such as is disclosed in Driggs U.S. Patent No. 1,911,943 of May 30, 1933. These showed that only a very low rhenium recovery (about 25%) could be expected, unless excessively high temperatures and long retorting time were utilized, together with forced introduction of air or steam directly into the charge. Moreover, the charged material was baked into a hard cake, which was extremely difficult to remove from the retort and to handle thereafter.

Typical laboratory data from these tests appear in the following table:

| Charge Wt., Pounds | | Temperature, °C | Time, hours | Re Recovery, percent | Conditions |
|---|---|---|---|---|---|
| Calcine | Acid | | | | |
| 50 | 50 | 400 | 7 | 25 | Air blown. |
| 50 | 50 | 450 | 7 | 25 | Do. |
| 25 | 25 | 500 | 7 | 53 | Do. |
| 25 | 25 | 500 | 12½ | 88 | Steam blown. |
| 20 | 40 | 500 | 17 | 79 | Air blown. |

The advantage of the preliminary roasting treatment of rhenium-bearing materials containing sulfur in excess of that combined with the rhenium is shown by laboratory data covering tests made without any preliminary roasting and others with various degrees of preliminary roasting. Typical test data appear in the following table:

| Size of Sample, gms. | Roast Conditions | Percent of Sulfur Remaining | Ratio of Acid to Material | Percent Re Recovered |
|---|---|---|---|---|
| 25 | No roasting | 100 | 7:1 | 90 |
| 25 | ___do___ | 100 | 4:1 | 45 |
| 25 | 3 hrs. at 450° C | 48.40 | 4:1 | 81 |
| 25 | 3 hrs. at 450° C | 48.40 | 3.5:1 | 72 |
| 25 | 2 hrs. at 450° C | 56.08 | 4:1 | 68 |

The above were laboratory bench tests, while the following were conducted in a laboratory rotary furnace:

| Size of Sample, lbs. | Roast Conditions | Percent of Sulfur Remaining | Ratio of Acid to Material | Percent Re Recovered |
|---|---|---|---|---|
| 8.5 | 2 hrs. at 600° C | 47.00 | 2:1 | 92.0 |
| 45 | 2 hrs. at 600° C | 48 | 2:1 | 91.0 |

It should be noted that sulfuric acid was the mineral acid employed in all of the above tests and the one most likely to be used in practice of the process industrially, because of its availability in quantity at comparatively low cost. Nevertheless, any mineral acid may be substituted therefor with appropriate adjustments in temperatures and times.

This application constitutes a continuation-in-part of our similarly entitled, copending application Serial Number 592,182, filed June 18, 1956, which has been abandoned in favor of the present application.

Whereas this invention is here illustrated and described with respect to particular preferred practice thereof, it should be understood that various changes may be made therein, without departing from the essential inventive concepts here disclosed.

We claim:
1. An acid process for the recovery of about 90 to 95% of the rhenium contained by a molybdenum sulfide metallurgical concentrate comprising thoroughly wetting such a concentrate with about twice its weight of sulfuric acid to make a slurry; as a first stage, heating said slurry to approximately 300° C. for approximately three hours to oxidize the rhenium content thereof; thereafter, and as a second stage, increasing the heat to approximately 400° C. and maintaining it at about that temperature for a period of approximately five hours, while vigorously agitating the slurry, to volatilize any unreacted acid and the rhenium oxide which formed; and treating the resulting vapors for the recovery of rhenium oxide.

2. The process of claim 1, wherein the mineral material contains sulfur in excess of what may be combined with the rhenium and is first subjected to a roasting operation at approximately 600° C. for approximately two hours for oxidizing a considerable quantity of sulfur therefrom without volatilizing any significant quantity of rhenium.

3. The process of claim 2, wherein the effluent from the preliminary roasting operation is passed through particle collecting and gas scrubber means, and the flue dust so recovered is passed to said first stage while the scrubber solution is passed to the rhenium oxide recovery stage.

4. The process of claim 1, wherein the vapors are treated for the recovery of the volatilized acid, and wherein the recovered acid is returned to the mineral-material-wetting stage.

5. The process of claim 1, wherein the vigorous agitation is carried out in and by means of a rotary furnace.

References Cited in the file of this patent
UNITED STATES PATENTS

| 1,911,943 | Driggs | May 30, 1933 |
| 2,579,107 | Bertolus | Dec. 18, 1951 |
| 2,809,092 | Zimmerley et al. | Oct. 8, 1957 |

OTHER REFERENCES

Schloen, J. H., et al.: "Journal of Metals," May 1950, pages 764–777.